(12) United States Patent
Fukui

(10) Patent No.: US 8,170,398 B2
(45) Date of Patent: May 1, 2012

(54) INFORMATION RECORDING AND REPRODUCING DEVICE HAVING RECORDING RESERVATION FUNCTION

(75) Inventor: Masanao Fukui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 828 days.

(21) Appl. No.: 12/289,373

(22) Filed: Oct. 27, 2008

(65) Prior Publication Data

US 2009/0110367 A1   Apr. 30, 2009

(30) Foreign Application Priority Data

Oct. 29, 2007  (JP) ................................. 2007-279809

(51) Int. Cl.
*H04N 5/76* (2006.01)
(52) U.S. Cl. .......................................... 386/291; 725/50
(58) Field of Classification Search ................ 725/50; 386/291, 297
See application file for complete search history.

(56) References Cited

U.S. PATENT DOCUMENTS

| | | | |
|---|---|---|---|
| 6,208,799 B1 * | 3/2001 | Marsh et al. ............... | 386/292 |
| 7,542,658 B2 * | 6/2009 | Watanabe .................. | 386/291 |
| 8,028,316 B2 * | 9/2011 | Kawai ......................... | 725/50 |

FOREIGN PATENT DOCUMENTS

| | | | |
|---|---|---|---|
| JP | 2000-341156 | * | 12/2000 |
| JP | 2003-333479 | * | 11/2003 |
| JP | 2005-244661 A | | 9/2005 |
| JP | 2005-303774 A | | 10/2005 |

OTHER PUBLICATIONS

Yamada, Translation of JP 2000-341156, Dec. 2000.*

* cited by examiner

*Primary Examiner* — David Harvey
(74) *Attorney, Agent, or Firm* — Morgan, Lewis & Bockius LLP

(57) ABSTRACT

After judgment that timer reservation has been set, upon judgment that a channel, a scheduled broadcast date, broadcast start time, and broadcast end time included in the EPG information respectively agree with a channel, a recording reservation date, recording start time, and recording end time included in recording reservation information, agreement information is displayed on a display device. On the other hand, upon judgment that any of them do not agree with each other, disagreement information is displayed on the display device. After the agreement information is displayed on the display device, a replacement from recording reservation through timer reservation for the desired program to recording reservation based on electronic program guide information is made for the desired program.

5 Claims, 6 Drawing Sheets

FIG.2

RECORDING RESERVATION SCREEN 200

| RESERVATION DATE | CHANNEL | RECORDING START TIME | RECORDING END TIME | RECORDING MODE | RECORDING MEDIUM |
|---|---|---|---|---|---|
| 07/10/8 | 6 | PM 09:00 | PM 10:00 | SP | DVD |
| | | | | | |
| | | | | | |
| | | | | | |
| | | | | | |
| | | | | | |
| | | | | | |

FIG.3

EPG SCREEN 300
OCTOBER 8, 2007 PROGRAM LIST

| | (3) TV A | (4) TV B | (5) TV C | (6) TV D | (7) TV E | (8) TV F |
|---|---|---|---|---|---|---|
| PM 9:00 | ... | ... | ... | PROFESSIONAL BASEBALL | ...... | ...... |
| | | | | SUSPENSE DRAMA | | |
| PM 10:00 | ...... | ... | ... | NEWS AT 10 | ... | ... |
| PM 11:00 | | | | MUSIC 11 | | |

FIG.4

EPG SCREEN PROGRAM LIST (6) TV D

400

OCTOBER 8, 2007

PM 09:30 PROFESSIONAL BASEBALL
PM 10:30 SUSPENSE DRAMA
PM 11:30 NEWS AT 10
PM 00:00 MUSIC 11
... ...

AGREEMENT INFORMATION DISPLAY SCREEN

CHANNEL (6), RECORDING START TIME (PM09:00), AND RECORDING END TIME (PM10:00) THROUGH TIMER RESERVATION AGREE WITH CHANNEL (6), BROADCAST START TIME (PM09:00), AND BROADCAST END TIME (PM10:00) THROUGH EPG RESERVATION. REPLACEMENT FROM TIMER RESERVATION TO EPG RESERVATION IS TO BE MADE.

FIG.6

DISAGREEMENT INFORMATION DISPLAY SCREEN

RECORDING START TIME (PM09:00) AND RECORDING END TIME (PM10:00) THROUGH TIMER RESERVATION DISAGREE WITH RECORDING START TIME (PM09:30) AND BROADCAST END TIME (PM10:30) THROUGH EPG RESERVATION.

TIMER RESERVATION INFORMATION IS TO BE MODIFIED? [Yes]~ 601
TIMER RESERVATION INFORMATION IS MADE AGREE WITH EPG INFORMATION? [Yes]~ 602
RESERVATION IS TO BE ENDED? [Yes]~ 603

INFORMATION RECORDING AND REPRODUCING DEVICE HAVING RECORDING RESERVATION FUNCTION

This application is based on Japanese Patent Application No. 2007-279809 filed on Oct. 29, 2007, and the contents of which are hereby incorporated by reference.

BACKGROUND OF THE INVENTION

1. Field of the Invention

The present invention relates to an information recording and reproducing device which records on a recording medium a program selected by receiving a digital television (TV) broadcast signal and other information and, which also reproduces the program and the other information recorded on the recording medium, and in particular, the present invention relates to process by recording reservation function of reserving program recording.

2. Description of Related Art

In recent years, in Japan, digital TV broadcast by BS digital broadcast using broadcast satellite (BS) and CS digital broadcast using CS has been wide spread, and further digital TV broadcast by digital terrestrial broadcast was started in some areas in December, 2003. In such digital TV broadcast, EPG (Electronic Program Guide) information including broadcast station channel specification, broadcast start time, broadcast end time, a program title, genre, program contents or the like, as information on the program to be broadcast, are transmitted by multiplexed into airwaves from a specific broadcast station.

By the way, for the information recording and reproducing device which records on a recording medium a program and other information selected by receiving a digital TV broadcast signal and also which reproduces the program and the other information recorded on the recording medium, EPG reservation, timer reservation, and G code reservation are known as methods of program recording reservation.

For the EPG reservation, by displaying an EPG screen on a display device such as a TV receiver, selecting from this EPG screen a display area where a program title or the like of a program to be recorded are displayed, and performing determination operation, recording reservation information indicating the program title of the program to be recorded, a reservation date of the recording, a channel through which the program to be recorded is broadcasted, recording start time, recording end time, and a recording mode, is set into a flash memory to thereby make recording reservation of the desired program.

For the timer recording, a recording reservation screen is displayed on the display device, and recording reservation information indicating a reservation date of recording a program to be recorded, a channel through which the program to be recorded is broadcasted, recording start time, recording end time, and a recording mode, is input onto the recording reservation screen and set into the flash memory to thereby make recording reservation of the desired program.

For the G code reservation, the recording reservation screen is displayed on the display device, a program to be recorded is selected from a program list on a newspaper, a G code corresponding to this program (for example, G code, VCR Plus+, VideoPlus+, ShowView, or the like) is obtained, and this G code is input onto the recording reservation screen and set into the flash memory to thereby make recording reservation of the desired program.

At this point though the EPG information, as described later, is transmitted from a specific broadcast station, but it includes a program list for a maximum of only eight days (about one week) starting from the current date as defined by the specifications, therefore, the program list for a maximum of only eight days starting from the current date can be displayed on the EPG screen.

Therefore, with the conventional information recording and reproducing device which records on a recording medium a program and other information selected by receiving a digital TV broadcast signal on and also which reproduces the program and the other information recorded on the recording medium, to make recording reservation of a program scheduled at date and time later than the period (typically a period of about one week) specified by the EPG information, the recording reservation cannot be made through the EPG reservation, and thus the recording reservation is typically performed through the timer reservation.

As described above, with the conventional information recording and reproducing device, in the recording reservation of a program scheduled at date and time later than the period specified by the EPG information, recording reservation through the timer reservation is performed. However, when there is change in broadcast start time and broadcast end time of a program to be recorded, the recording start time and the recoding end time of the program to be recorded become different from those reserved, so that a program in a time before the desired program to be recorded is recorded or a program in a time after the desired program to be recorded is recorded, thus raising a problem that the entire desired program to be recorded cannot be recorded. Moreover, in the timer reservation, since time of a clock is counted by a timer inside the device and thus the time may go ahead or behind, then, there arises a problem that accurate recording start time and accurate recording end time cannot be obtained.

At this point, in conventional art described in JP-A-2005-244661, reserved program information set based on the electronic program guide information (the EPG information) is checked regularly or at specific timing, and in a case where there is disagreement in contents, this disagreement is displayed. However, this does not solve the problem described above when the recording reservation through the timer reservation is performed for recording reservation of a program scheduled at date and time later than the period specified by the EPG information.

Further, in conventional art described in JP-A-2005-303774, about arbitrary broadcast information input without depending on received the EPG information, recording reservation information is compared with the EPG information, and in a case where there is disagreement in contents, this disagreement is displayed. However, this conventional art also does not solve the problem described above when the recording reservation through the timer reservation is performed for recording reservation of a program scheduled at date and time later than the period specified by the EPG information.

SUMMARY OF THE INVENTION

The present invention is made to solve the problem as described above, and it is an object of the invention to provide an information recording and reproducing device capable of certainly recording a program to be recorded without requiring editing by adding a program title or the like even when recording reservation through timer reservation is made for recording reservation of a program scheduled at date and time later than a period specified by the EPG information.

To solve the problem described above, an information recording and reproducing device according to one aspect of the present invention records a program channel selected by receiving a digital TV broadcast signal and other information onto a recording medium and also reproduces the program and the other information recorded on the recording medium, the information recording and reproducing device includes: a timer reservation judgment part judging whether or not timer reservation has been set, the timer reservation, through input operation of recording reservation information including a channel, a recording reservation date, recording start time, recording end time, and a recording mode, all related to a program to be recorded, storing the recording reservation information into a memory and then making recording reservation of the desired program; a recording reservation contents judgment part, after the judgment that the timer reservation has been set, judging whether or not a channel, a scheduled broadcast date, broadcast start time, and broadcast end time included in electronic program guide extracted from a TV broadcast signal of a specific broadcast station respectively agree with the channel, the recording reservation date, the recording start time, and the recording end time included in the recording reservation information; an agreement information display part, upon the judgment that the channel, the scheduled broadcast date, the broadcast start time, and the broadcast end time included in the electronic program guide extracted respectively agree with the channel, the recording reservation date, the recording start time, and the recording end time included in the recording reservation information, displaying on a display device agreement information indicating contents of the agreement; a disagreement information display part, after the channel, the scheduled broadcast date, the broadcast start time, and the broadcast end time included in the electronic program guide extracted are respectively compared with the channel, the recording reservation date, the recording start time, and the recording end time included in the recording reservation information, upon judgment that any of them disagree with each other, displaying on the display device displaying on the display device disagreement information indicating contents of the disagreement; and a recording reservation replacement part, after the agreement information is displayed on the display device, making a replacement for the desired program from the recording reservation through the timer reservation to the recording reservation based on the electronic program guide information.

With this configuration, in recording reservation of a program scheduled at a date later than a period specified by the electronic program guide information, recording reservation through timer reservation is performed, but after the agreement information is displayed on the display device, for the desired program the recording reservation through the timer reservation is replaced with the recording reservation based on the electronic program guide information. Therefore, when the recording reservation date of the program to be recorded, is set through the timer reservation at a period of more than about one week away, at a point in time at which the date and time has reached the period within the one specified in the electronic program guide information, the same process as the recording reservation based on the electronic program guide information can be performed, thereby permitting recording without requiring editing by adding a program title or the like and uniform recording without any recording interruption and delay, so that the editing by adding the program title or the like is not required and the program to be recorded can be recorded without omission. Moreover, displaying the agreement information permits confirming that the recording reservation information has been introduced, and displaying the disagreement information can urge correction of the recording reservation information, thereby permitting elimination of modification errors that cannot be identified with a set mode of the recording reservation.

Further, in one aspect of the invention, the recording reservation contents judgment part, after the judgment that the timer reservation has been set, when the electronic program guide information is updated, the electronic program guide information comes to include, after a predetermined period, program information indicating the channel, the scheduled broadcast date, the broadcast start time, and the broadcast end time respectively corresponding to the channel, the recording reservation date, the recording start time, and the recording end time included in the recording reservation information through the timer reservation whereby comparison of each of the information can be made, judges whether or not the channel, the scheduled broadcast date, the broadcast start time, and the broadcast end time included in the electronic program information respectively agree with the channel, the recording reservation date, the recording start time, and the recording end time included in the recording reservation information.

Thus, when the recording reservation date of the program to be recorded is set through the timer reservation at a period of more than about one week away, at a point in time at which the date and time has reached the period within the one specified in the electronic program guide information, the same process as the recording reservation based on the electronic program guide information can be performed.

Further, in one aspect of the invention, the recording reservation replacement part, upon replacing for the desired program the recording reservation through the timer reservation with the recording reservation based on the electronic program guide information, when the recording reservation contents judgment part respectively compares the channel, the scheduled broadcast date, the broadcast start time, and the broadcast end time included in the electronic program guide information with the channel, the recording reservation date, the recording start time and the recording end time included in the recording reservation information, and it is judged that any of them are in disagreement, makes modification to the recording reservation information through the timer reservation, and then replaces the recording reservation through the timer reservation to the recording reservation based on the electronic program guide information.

Thus, even when the recording reservation information through the timer reservation has been modified, replacing the recording reservation through the timer reservation with the recording reservation based on the electronic program guide information can be done, which permits performing the same process as that for the recording reservation based on the electronic program guide information.

The information recording and reproducing device according to one aspect of the invention further includes: a selection detection part, which after the disagreement information is displayed on the display device, detects whether it has been selected to modify the recording reservation information though the timer reservation or to bring the channel, the recording start time, and the recording end time through the timer reservation into agreement with the channel, the broadcast start time, and the broadcast end time included in the electronic program guide information; a reservation information input again enabling part, which upon the detection by the selection detection part that it has been selected to modify the recording reservation information through the timer reservation, enables inputting again of the recording reservation information through the timer reservation; and an information Agreement process part which, upon the detection by the selection detection part that it has been selected to bring the channel, the recording start time, and the recording end time through the timer reservation into agreement with the channel, the broadcast start time, and the broadcast end time included in the electronic program guide information, brings the channel, the recording start time, and the recording end time through the timer reservation into agreement with the channel, the broadcast start time, and the broadcast end time included in the electronic program guide information.

With this configuration, when any of the channel, the recording start time, and the recording end time through the timer reservation disagree with the channel, the broadcast start time, and the broadcast end time, it can be selected whether to input again the recording reservation information through the timer reservation or to bring the channel, the recording start time, and the recording end time through the timer reservation into agreement with the channel, the broadcast start time, and the broadcast end time included in the electronic program guide information, and it also becomes possible to bring the channel, the recording start time, and the recording end time included in the recording reservation information into agreement with the channel, the broadcast start time, and the broadcast end time included in the electronic program guide information.

In addition, the information recording and reproducing device according to one aspect of the invention further includes a list display part which, to display the program added with the modification in a list on the display device, displays the program added with the modification on an electronic program guide screen on the display device after color coding or marking a display region of the program added with the modification.

Because of this, the program added with the modification can be discriminated and the program added with the modification can be identified immediately even after the event, which makes it easier to modify the program.

According to the present invention as described above, in recording reservation of a program scheduled at a date later than a period specified by the electronic program guide information, recording reservation through timer reservation is performed, but after the agreement information is displayed on the display device, for the desired program the recording reservation through the timer reservation is replaced with the recording reservation based on the electronic program guide information. Therefore, when the recording reservation date of the program to be recorded, is set through the timer reservation at a period of more than about one week away, specified in the electronic program guide information, the same process as the recording reservation based on the electronic program guide information can be performed, thereby permitting recording without requiring editing by adding a program title or the like and uniform recording without any certain recording interruption and delay, so that the editing by adding the program title or the like is not required and the program to be recorded can be recorded without omission.

BRIEF DESCRIPTION OF THE DRAWINGS

FIG. 2 is a diagram to show one example of a recording reservation screen in the above described embodiment;

FIG. 3 is a diagram to show one example of an EPG screen displayed on a display device in the above described embodiment;

FIG. 4 is a diagram to show another example of the EPG screen displayed on the display device in the above described embodiment;

FIG. 5 is a diagram to show one example of an agreement information display screen displayed on the display device in the above described embodiment;

FIG. 6 is a diagram to show one example of a disagreement information display screen displayed on the display device in the above described embodiments.

DETAILED DESCRIPTION OF THE PREFERRED EMBODIMENTS

Figure 1:
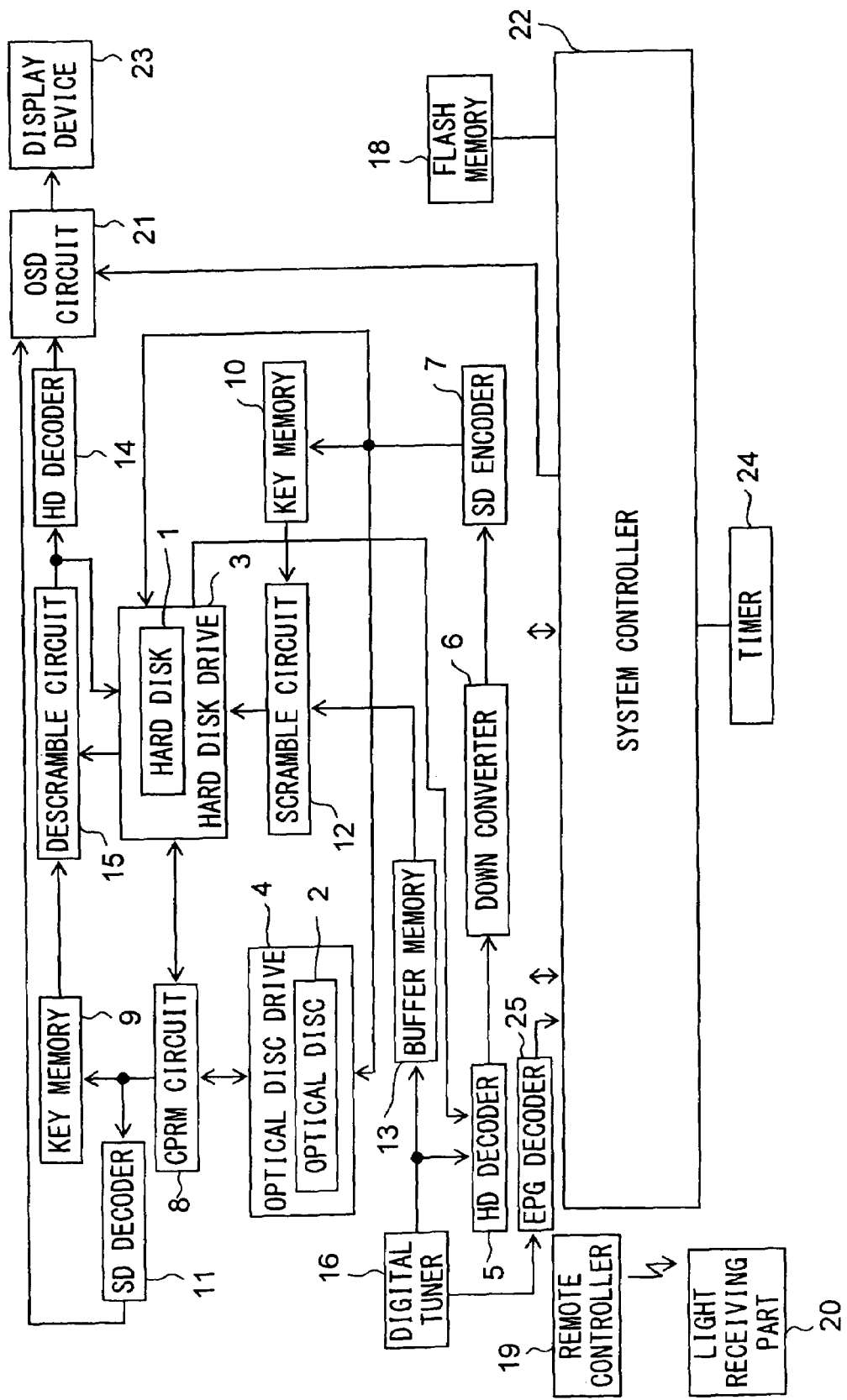
FIG. 1 is a block diagram to show configuration of a complex type recording and reproducing device as an information recording and reproducing device according to one embodiment of the present invention.

Hereinafter, the embodiments of the present invention will be described with reference to accompanied drawings. In an information recording and reproducing device which can be applied to digital broadcast reception, and capable of recording, when a reservation has been made over a period settable according to digital broadcast specifications, process is performed through action as described below. The term "digital broadcast specifications" mentioned here is standards, for example, ATSC (Advanced Television System Committee) in USA or the like, DVB-T (Digital Video Broadcasting-Terrestrial) in Europe, and ISDB-T (Integrated Services Digital Broadcast-Terrestrial) in Japan, and EPG handled in methods according to these digital broadcast specifications is simply described as digital EPG here.

In the information recording and reproducing device according to the present embodiment, in order that, at a point in time when specified date and time of recording reservation reaches within a digital EPG acquisition period (about one week), a program for which timer reservation has been simply set is subjected to the same process as that of digital EPG reservation (hereinafter simply referred to as EPG reservation), the EPG reservation is introduced to perform function of the EPG reservation.

Since time of a clock counted by a timer provided in the device and a character string including a reservation date, a channel, recording start time, recording end time, and a recording mode, which are set in the device, permits program identification, thereby permitting a shift from the timer reservation to the EPG reservation.

In the information recording and reproducing device, the EPG information is usually obtained from a specific broadcast station every day or regularly, and this the EPG information is compared with contents corresponding to contents of timer reservation, and required program information of the corresponding contents is replaced with corresponding program information of the EPG information. To be more concrete, the recording start time and recording end time of the program to be recorded are modified, and a program title is added. In order that this program with the modification can be later compared with a different program when displayed in a list on an EPG screen, a display region where this program is displayed is color coded or the title of this program is marked with an arrow. Consideration is to be given to the modification so that copying as timer reservation information the contents corresponding to the EPG information or replacing the contents of the timer reservation with the contents corresponding to the EPG information can be easily made by viewing the EPG screen or the recording reservation screen.

To select whether or not to replace the recording reservation information with the EPG information, when power of the device is turned on through operating a power key on a remote controller or an operation part of the main body, the information is displayed in an agreement information display screen or a disagreement information display screen by the display device, thereby providing a state where urging a user to confirm ("YES" or "NO"). In case it is "NO", permitted in the disagreement information display screen selecting whether to return to process of permitting inputting information of the original timer reservation for the purpose of modifying the timer reservation or to bring the timer reservation information into agreement with the EPG reservation information. A mode for setting ON/OFF function that provides the aforementioned checking is previously added.

As the information recording and reproducing device according to one embodiment of the present invention provided with the function described above, a complex type information recording and reproducing device will be described below. FIG. 1 is a block diagram to show configuration of the complex type information recording and reproducing device as the information recording and reproducing device according to one embodiment of the invention. In this embodiment, recording reservation function in the complex type information recording and reproducing device provided with both a hard disk drive (hard disk device) and an optical disc drive (optical disc device) will be described. It is needless to say that, however, the same recording reservation function can be applied to a device which has only the hard disk drive (hard disk device) or only the optical disc drive (optical disc device).

In FIG. 1, this complex type information recording and reproducing device 1 is so adapted to be capable of recording/reproducing video and audio information on/from a hard disk 1 and an optical disc 2 independently from each other, and includes the hard disk drive 3, the optical disc drive 4, an HD (High Definition) decoder 5, a down converter 6, an SD (Standard Definition) encoder 7, a CPRM (Content Protection for Recordable Media) circuit 8, key memories 9, 10, an SD decoder 11, a scramble circuit 12, a buffer memory 13, an HD decoder 14, a descramble circuit 15, a digital tuner 16, a flash memory 18, a remote controller 19, a light receiving part 20, an OSD circuit 21, a timer 24, an EPG decoder 25, and a system controller 22.

The hard disk drive 3 records/reproduces the video and audio information on/from the hard disk 1, and the optical disc drive 4 records/reproduces the video and audio information on/from the optical disc 2. The HD decoders 5 and 14 decode an HD stream compressed (encoded) in an MPEG method. The down converter 6 is an image quality conversion circuit that converts HD video data related to a video of an HD size (1920 pixels×1080 pixels) into SD data related to a video of an SD size (720 pixels×480 pixels). The SD encoder 7 compresses (encodes) in the MPEG method the SD data related to the video of an SD size output after subjected to the conversion by the down converter 6 and generates an SD stream.

The CPRM circuit 8 performs encrypting and decrypting various data recorded on the optical disc 2 for copy protection in accordance with CPRM. The key memory 10 or the key memory 9 stores a scramble key used for scramble process of an HD stream or descramble process of scramble data. The scramble process refers to process of converting contents information indicating a predetermined video and audio into information that the aforementioned predetermined video and audio cannot be indicated as a separate unit, that is, scramble information. That is, the scramble information is not information that indicates contents information by itself, but only after data processing in combination with the scramble key is performed, it becomes information indicating various videos, audios or the like Therefore, as long as the scramble information is generated, a copy right of the contents can be appropriately protected. The SD decoder 11 decodes the SD stream from the MPEG decoder 8 compressed (encoded) in the MPEG method to generate SD data related to the video of the SD size.

The digital tuner 16 selects, from among digital terrestrial broadcast signals received through an antenna, not shown, a digital terrestrial broadcast signal from a desired TV broadcast station and then outputs it as an HD video and audio signal (HD stream). The buffer memory 13 can temporarily store the HD stream from the digital tuner 16, and can output the stored HD stream to the scramble circuit 12 at desired timing (for example, timing in accordance with the scramble key from the key memory 10 input into the scramble circuit 12).

The scramble circuit 12, based on the scramble key read from the key memory 10, performs the scramble process on the HD stream read from the buffer memory 13. This consequently generates the scramble data. The descramble circuit 15, based on the scramble key read from the key memory 9, performs the descramble process on the scramble data read from the hard disk 1. This descramble process refers to process, opposite to the scramble process, performed on the scramble data, and as a result of this, the HD stream is generated by the descramble circuit 15 and input into the HD decoder 14, and then decoded by the HD decoder 4. From the HD decoder 14, data related to a video of an HD image quality is input to the OSD circuit 21 and supplied as a displayable video signal to the display device 23. Therefore, on the display device 23, a video of a high image quality is displayed.

The remote controller 19 has a plurality of operation keys, and operates this complex type information recording and reproducing device through an infrared signal. The light receiving part 20 receives the infrared signal from the remote controller 19, converts this infrared signal into an electrical signal, and provides it to the system controller 22. The system controller 22 includes a CPU not shown or the like, and controls the entire device composed by the hard disk drive 3, the optical disc drive 4, and the like. The flash memory 18 stores programs and data required for control and processing performed by the system controller 22.

This system controller 22 includes, as features of this embodiment, a timer reservation judgment part that judges whether or not timer reservation has been set by which recording reservation information including a channel, a recording reservation date, a recording start time, a recording end time, and a recording mode related to a program to be recorded is stored into the flash memory 18 through its input operation to make recording reservation of the desired program; a recording reservation contents judgment part that, after the judgment that the timer reservation has been set, judges whether or not a channel, a scheduled broadcast date, a broadcast start time, and a broadcast end time included in EPG (electronic program guide) information extracted from a TV broadcast signal of a specific broadcast station respectively agree with the channel, the recording reservation date, the recording start time, and the recording end time included in the recording reservation information; an agreement information display part, upon the judgment that the channel, the scheduled broadcast date, the broadcast start time, and the broadcast end time included in the electronic program guide information respectively agree with the channel, the recording reservation date, the recording start time, and the recording end time included in the recording reservation information, displaying on a display device 23 agreement information indicating contents of the agreement; a disagreement information display part that, after respectively comparing the channel, the scheduled broadcast date, the broadcast start time, and the broadcast end time included in the EPG information with the channel, the recording reservation date, the recording start time, and the recording end time included in the recording reservation information, upon judgment that any of them does not agree, displays on the display device 23 disagreement information indicating the disagreed contents; and a recording reservation replacement part that, after the agreement information is displayed on the display device 23, replaces the desired program recording reservation through the timer reservation with recording reservation based on the EPG information.

The recording reservation contents judgment part, after the judgment that the timer reservation has been set, when the EPG information is updated, the EPG information comes to include, after a predetermined period, program information indicating the channel, the scheduled broadcast date, the broadcast start time, and the broadcast end time respectively corresponding to the channel, the recording reservation date, the recording start time, and the recording end time included in the recording reservation information through the timer reservation whereby comparison of each of the information can be made, judges whether or not the channel, the scheduled broadcast date, the broadcast start time, and the broadcast end time included in the EPG information respectively agree with the channel, the recording reservation date, the recording start time, and the recording end time included in the recording reservation information.

The recording reservation replacement part, upon replacing for the desired program the recording reservation through the timer reservation with the recording reservation based on the EPG information, when the recording reservation contents judgment part compares the channel, the scheduled broadcast date, the broadcast start time, and the broadcast end time included in the EPG information with the channel, the recording reservation date, the recording start time, and the recording end time included in the recording reservation information, and it is judged that any of them are not in agreement, makes modification to the recording reservation information through the timer reservation, and then replaces the recording reservation through the timer reservation with the recording reservation based on the EPG information.

Moreover, the system controller 22 includes: a selection detection part, which after the disagreement information is displayed on the display device 23, detects that it has been selected whether to modify the recording reservation information though the timer reservation or to bring the channel, the recording start time, and the recording end time through the timer reservation into agreement with the channel, the broadcast start time, and the broadcast end time included in the EPG information; a reservation information input again enabling part, which upon the detection by the selection detection part that it has been selected to modify the recording reservation information through the timer reservation, enables inputting again of the recording reservation information through the timer reservation; an information Agreement process part which, upon the detection by the selection detection part that it has been selected to bring the channel, the recording start time, and the recording end time through the timer reservation into agreement with the channel, the broadcast start time, and the broadcast end time included in the EPG information, brings the channel, the recording start time, and the recording end time through the timer reservation into agreement with the channel, the broadcast start time, and the broadcast end time included in the EPG information; and a list display part which, to display the program added with the modification in a list on the display device 23, displays it in an electronic program guide screen on the display device 23 after color coding or marking a display region of the program added with the modification.

FIG. 2 is a diagram to show one example of a recording reservation screen in this embodiment. In FIG. 2, the recording reservation screen 200 has: an item "reservation date" indicating that a program to be recorded is recorded on a scheduled broadcast date on which this program is broadcasted; an item "channel" indicating a channel number of the broadcast station from which this program is broadcasted; an item "recording start time" that is set in correspondence with a broadcast start time at which this program is broadcasted; an item "recording end time" that is set in correspondence with broadcast end time of this program, an item "recording mode" that shows recording speed and is set to XP, SP, LP, EP, or the like; and an item "disc" for setting whether a recording medium on which this program is recorded is a hard disk or an optical disc.

In the example of the recording reservation screen 200 shown in FIG. 2, to make recording reservation of "suspense drama" shown in FIG. 3, it is indicated that a reservation date for the program to be recorded is Oct. 8, 2007, the channel is 6, the recording start time is PM09:00, the recording end time is PM10:00 (more accurately PM9:59:59), the recording mode is SP, and the disc is DVD (optical disc).

FIG. 3 is a diagram to show one example of an EPG screen displayed on the display device in this embodiment. Displayed in the example of the screen 300 shown in FIG. 3 is a program list of TVs A to ° F. for a broadcast time from PM 9:00 to AM 0:00 (more accurately, PM 11:59:59) on Oct. 8, 2007. For example, for the TV D at channel 6, program titles displayed are "Professional baseball", "Suspense drama", "News at 10", and "Music 11". When recording reservation is made by using this EPG screen 300, a display region indicating the program title of the program for which recording reservation has been made is color coded by, for example, blue or the like.

In this example, since the professional baseball is extended by 30 minutes (ending at PM 9:30) over the original broadcast end time (PM 9:00), it is indicated that the programs including the professional baseball and beyond are each to be broadcasted 30 minutes behind the schedule. Note that program titles of the other channels are omitted from the illustration. Moreover, what can be done on this EPG screen 300 are: for example, displaying program titles of programs in a different time by operating an up-down direction key on a remote controller; displaying program titles of a channel other than the channel currently displayed by operating a left-right direction key on the remote controller; or displaying a list of programs for a maximum of eight days from the current date by operating a skip key on the remote controller.

FIG. 4 is a diagram to show another example of the EPG screen displayed on the display device in this embodiment. Displayed in the example of an EPG screen 400 shown in FIG. 4 is a list of programs for the TV D at channel 6 including the professional baseball and beyond on Oct. 8, 2007. Displayed on the TV D at channel 6 are, as the program titles, "Professional baseball", "Suspense drama", "News at 10", and "Music 11".

In this example, since the broadcast end time of the professional baseball is changed by 30 minutes behind the original schedule on the program list, it is indicated that the programs including the professional baseball and beyond are each to be broadcasted 30 minutes behind the schedule. What can be done on this EPG screen 400 are: for example, displaying program titles of programs in a different time and program titles of programs to be broadcasted thereafter by operating an up-down direction key on a remote controller; displaying program titles of a channel other than the channel currently displayed by operating a left-right direction key on the remote controller; or displaying a list of programs for a maximum of eight days from the current date by operating a skip key on the remote controller.

FIG. 5 is a diagram to show one example of the agreement information display screen displayed on the display device in this embodiment. On the agreement information display screen 500 shown in FIG. 5, a message is displayed which indicates "Channel (6), the recording start time (PM09:00), and the recording end time (PM10:00) through the timer reservation have agreed with channel (6), the recording start time (PM09:00), and the broadcast end time (PM10:00) through the EPG reservation. The timer reservation is to be replaced with the EPG reservation". On this agreement information display screen 500, the channel, the recording start time, and the recording end time through the timer reservation are respectively compared with the channel, the broadcast start time, and the broadcast end time through the EPG reservation, and are displayed on the display device when in agreement.

FIG. 6 is a diagram to show one example of the disagreement information display screen displayed on the display device in this embodiment. On the disagreement information display screen 600 shown in FIG. 6, messages displayed is: "The recording start time (PM09:00) and the recording end time (PM10:00) through the timer reservation disagree with the recording start time (PM09:30) and the broadcast end time (PM10:30) through the EPG reservation.", "The timer reservation information is to be modified? Yes"; "The timer reservation information is made agree with the EPG reservation information? Yes"; and "The reservation is to be ended? Yes".

This disagreement information screen 600, when the recording start time and the recording end time through the timer reservation are respectively compared with the broadcast start time and the broadcast end time through the EPG reservation and they disagree with each other, is displayed on the display. Then to modify the recording start time and the recording end time through the timer reservation, upon selection and determination of the Yes 601, the timer recording reservation screen 200 (see FIG. 2) is displayed on the display device in order that the timer reservation information can be modified. Moreover, to bring the recording start time and the recording end time as the timer reservation information into agreement with the broadcast start time and the broadcast end time as the EPG information, upon selection and determination of the Yes 602, the recording start time and the recording end time as the timer reservation information are modified and is brought into agreement with the broadcast start time and the broadcast end time as the EPG reservation information. Moreover, without modifying the timer reservation information or without bringing it into agreement with the EPG reservation information, to end this recording reservation, upon selection and determination of Yes 603, this recording reservation ends without being executed.

Figure 7:
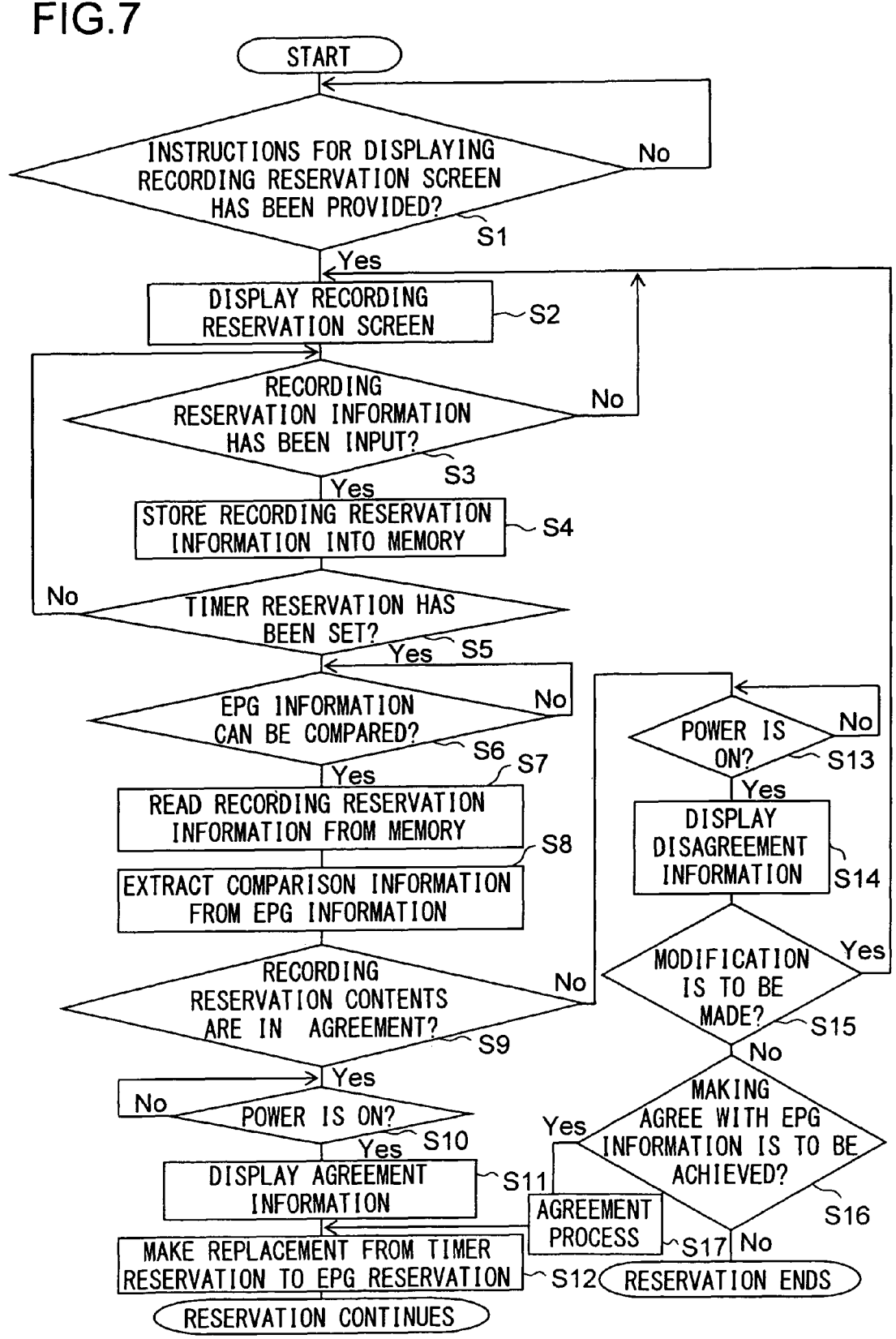
FIG. 7 is a flowchart to explain a process of recording reservation in the above described embodiment.

FIG. 7 is a flowchart to explain a process of recording reservation in this embodiment. Referring to this flowchart and FIG. 1 to FIG. 6, the process of recording reservation will be described.

The user operates the remote controller 19 to give to the system controller 22 instructions for displaying the recording reservation screen on the display device 23, upon which the system controller 22 detects the instructions for displaying the recording reservation screen through the timer reservation (step S1), reads recording reservation screen data from the flash memory 18, subjects this recording reservation screen data to OSD process in the OSD circuit 21, and supplies it as a recording reservation screen signal for display to the display device 23 to thereby display for example, the recording reservation screen 200 (see FIG. 2) on the display device 23. Note that, however, that at this point in time, the recording reservation screen 200 is displayed on which the recording reservation information through the timer reservation is not input.

Here, the user, while viewing the recording reservation screen 200, operates the remote controller 19 to input the recording reservation information through the timer reservation. In this example, as the recording reservation information by operating the remote controller 19: "10/8/2008" indicating Oct. 8, 2007 for the item "reservation date"; "6" for the item "channel"; "0PM9:00" for the time "recording start time"; "10:00 PM" for the item "recording end time"; "SP" for the item "recording mode"; and "DVD" for the item "recording medium", are input.

Then upon completion of inputting the recording reservation information, when the user presses the determination key on the remote controller 19, the timer reservation judgment part of the system controller 22 detects that the recording reservation information has been input (step S3), stores this recording reservation information in the flash memory 18 (step S4), and judges whether or not timer reservation for recording reservation of a desired program has been set (step S5), and in this case, it is judged that the timer reservation has been set.

However, a TV broadcast signal of a specific broadcast station is output from the digital tuner 16 by station selection operation by the digital tuner 16, the EPG information included in this TV broadcast signal is extracted from the EPG decoder 25 and input into the system controller 22. The EPG information includes program information for a maximum of eight days (corresponding to about one week) from the current time, is updated twice a day, and is transmitted twice a day, for example, at AM 0:00 and PM 0:00. Therefore, in a case where the complex type recording and reproducing device according to the present embodiment is configured to receive the EPG information at AM 0:00 and PM 0:00, the EPG information is updated at AM 0:00 and PM 0:00 overwritten and stored into the flash memory 18. In a case where the complex type recording and reproducing device is configured to receive the EPG information only once at AM 0:00, the EPG information updated at AM 0:00 is overwritten into the flash memory 18.

After the judgment that the timer reservation has been set, when the EPG information is updated, after a predetermined period (when comparable program information becomes to be included), the EPG information comes to include program information indicating the channel, the scheduled broadcast date, the broadcast start time, and the broadcast end time included in the recording reservation information through timer reservation respectively corresponding to the channel, the recording reservation date, the recording start time, and the recording end time included in the recording reservation information through the timer reservation, and when each of the information can be subjected to comparison (step S6), the recording reservation contents judgment part of the system controller 22 reads the recording reservation information from the flash memory 18 (step S7), extracts, from the EPG information, the channel, the scheduled broadcast date, the broadcast start time, and the broadcast end time respectively corresponding to the channel, the recording reservation date, the recording start time, and the recording end time included in the recording reservation information as comparison information (step S8), and judges whether or not the channel, the scheduled broadcast date, the broadcast start time, and the broadcast end time included in the EPG information respectively agree with the channel, the recording reservation date, the recording start time, and the recording end time included in the recording reservation information (step S9).

Upon the judgment that the channel, the scheduled broadcast date, the broadcast start time, and the broadcast end time included in the EPG information respectively agree with the channel, the recording reservation date, the recording start time, and the recording end time included in the recording reservation information, the agreement information display part of the system controller 22, upon detection of power on operation by the remote controller 19 (or an operation part of the main body, not shown) (step S10), displays on the display device 23 agreement information indicating contents of this agreement (step S11).

That is, the agreement information display part of the system controller 22, upon the detection of power on operation by the remote controller 19 (or the operation part of the main body, not shown), displays on the display device 23, for example, the agreement information display screen 500 (see FIG. 5) indicating contents of agreement information based on the channel, the recording reservation date, the recording start time, and the recording end time included in the recording reservation information and the channel, the scheduled broadcast date, the broadcast start time, and the broadcast end time included in the EPG information. This is provided for the user to confirm the agreement information and also to confirm replacement from the timer reservation to the EPG reservation as shown in the agreement information display screen 500.

After the agreement information is displayed on the display device 23, the recording reservation replacement part of the system controller 22 make a replacement for a desired program from recording reservation through timer reservation to recording reservation based on the EPG information (step S12). By the replacement from the recording reservation through the timer reservation to the recording reservation based on the EPG information, as the recording reservation information related to the program to be recorded, a program title in addition to the channel, the recording reservation date, the recording start time, and the recording end time is input, and after the reserved recording, the program title of the program recorded is also displayed on a reproduction list, which improves the user friendliness.

On the other hand, the channel, the scheduled broadcast date, the broadcast start time, and the broadcast end time included in the EPG information are respectively compared with the channel, the recording reservation date, the recording start time, and the recording end time included in the recording reservation information (step S9), upon judgment that any of them does not agree, the disagreement information display part of the system controller 22, upon the detection of power on operation by the remote controller 19 (or the operation part of the main body, not shown) (step S13), displays on the display device 23, for example, the agreement information display screen 600 (see FIG. 6) indicating contents of disagreement information based on the channel, the recording reservation date, the recording start time, and the recording end time included in the recording reservation information and the channel, the scheduled broadcast date, the broadcast start time, and the broadcast end time included in the EPG information (step S14).

In the comparison of the channel, the recording reservation date, the recording start time, and the recording end time included in the recording reservation information with the channel, the scheduled broadcast date, the broadcast start time, and the broadcast end time included in the EPG information, in a case where the recording start time and the broadcast start time differ from each other and also the recording end time and the broadcast end time differ from each other although the channels and the recording reservation date are in agreement, since a time between the recording start time and the recording end time overlap a time between the broadcast start time and the broadcast end time in some time, the use of the time between the recording start time and the recording end time permits detection of the broadcast start time and the broadcast end time of a program to be recorded, thus permitting judging whether or not the recording start time and the recording end time included in the recording reservation information respectively agree with the broadcast start time and the broadcast end time included in the EPG information. For example, when the broadcast start time and the broadcast end time both at the timer reservation made for a given program are AM 9:00 and PM10:00, respectively, and then are modified at a later date so that the broadcast start time is set at PM 9:30 and the broadcast end time is PM10:30, the time between PM 9:30 and PM10 overlap, which permits the judgment described above.

Next, the user views the disagreement information display screen 600, and selects and determines "Timer reservation information to be modified?" by operating the remote controller 19, upon which the selection detection part of the system controller 22 detects instructions for modifying the timer reservation information (step S15), returns to the process of step S2, enables again the inputting of the information on the reservation through the timer reservation, and displays on the display device 23, for example, the recording reservation screen 200 as shown in FIG. 2. Then the user views the recording reservation screen 200, modifies the recording start time, for example, from "PM9:00" to "PM9:30", and the recording end time from "PM10:00" to "PM10:30". Thereafter, the process at and after step S3 is performed in the same manner.

On the EPG screen 300 shown in FIG. 3, for the TV D at channel 6, a display region displaying the program title "suspense drama" as the program broadcasted in the time from the broadcast start time "PM9:30" to the broadcast end time "PM10:30" is color coded so as to be discriminated from other display regions. This color coding proves that the recording reservation of the suspense drama has been made and modified. Moreover, in a case where the EPG screen is the EPG screen 400 as shown in FIG. 4, for the TV D at channel 6, the program title "suspense drama" of the program broadcasted in the time from the broadcast start time "0PM9:30" to the broadcast end time "10:30 PM" is marked by an arrow 401. This arrow 401 proves that recording reservation of the suspense drama has been made and modified.

Moreover, the user views the disagreement information display screen 600, and selects and determines "timer reservation information to be brought into agreement with EPG reservation?" by operating the remote controller 19, upon which the selection detection part of the system controller 22 detects instructions for bringing into agreement with the EPG information (step S16), whereby the information agreement process part of the system controller 22 brings the channel, the recording start time, and the recording end time through the timer reservation into agreement with the channel, the broadcast start time, and the broadcast end time included in the EPG information (step S17).

Thereafter, the recording reservation replacement part of the system controller 22 make a replacement for a desired program from the recording reservation through the timer reservation to recording reservation based on the EPG information (step S12). By the replacement from the recording reservation through the timer reservation to the recording reservation based on the EPG information, as the recording reservation information related to the program to be recorded, a program title in addition to the channel, the recording reservation date, the recording start time, and the recording end time is input, and after the reserved recording, the program title of the program recorded is also displayed on a reproduction list, which improves the user friendliness.

According to the embodiments described above, in recording reservation of a program at a date exceeding a period specified by the EPG information, recording reservation through timer reservation is performed, but after the agreement information is displayed on the display device 23, a replacement for the desired program from the recording reservation through the timer reservation to the recording reservation based on the EPG information is made. Therefore, when the recording reservation date of the program to be recorded is set through the timer reservation at a period of more than about one week away, at a point in time at which the date has reached the period within the one specified in the EPG information, the same process as the recording reservation based on the EPG information can be performed, thereby permitting recording without requiring editing by adding a program title or the like and uniform recording without any recording interruption and delay, so that the editing by adding the program title or the like is not required and the program to be recorded can be recorded without omission.

The present invention is applicable to recording reservation function in a hard disk device, an optical disc device, or a machine combining these devices.

What is claimed is:

1. An information recording and reproducing device recording a program channel selected by receiving a digital TV broadcast signal and other information onto a recording medium and also reproducing the program and the other information recorded on the recording medium, the information recording and reproducing device comprising:
   a timer reservation judgment part judging whether or not timer reservation has been set, the timer reservation, through input operation of recording reservation information including a channel, a recording reservation date, recording start time, recording end time, and a recording mode, all related to a program to be recorded, storing the recording reservation information into a memory and then making recording reservation of the desired program;
   a recording reservation contents judgment part, after the judgment that the timer reservation has been set, judging whether or not a channel, a scheduled broadcast date, broadcast start time, and broadcast end time included in electronic program guide extracted from a TV broadcast signal of a specific broadcast station respectively agree with the channel, the recording reservation date, the recording start time, and the recording end time included in the recording reservation information;
   an agreement information display part, upon the judgment that the channel, the scheduled broadcast date, the broadcast start time, and the broadcast end time included in the electronic program guide extracted respectively agree with the channel, the recording reservation date, the recording start time, and the recording end time included in the recording reservation information, displaying on a display device agreement information indicating contents of the agreement;
   a disagreement information display part, after the channel, the scheduled broadcast date, the broadcast start time, and the broadcast end time included in the electronic program guide extracted are respectively compared with the channel, the recording reservation date, the recording start time, and the recording end time included in the recording reservation information, upon judgment that any of them disagree with each other, displaying on the display device displaying on the display device disagreement information indicating contents of the disagreement; and
   a recording reservation replacement part, after the agreement information is displayed on the display device, making a replacement for the desired program from the recording reservation through the timer reservation to the recording reservation based on the electronic program guide information,
   wherein the recording reservation replacement part, upon replacing for the desired program the recording reservation through the timer reservation with the recording reservation based on the electronic program guide information, when the recording reservation contents judgment part respectively compares the channel, the scheduled broadcast date, the broadcast start time, and the broadcast end time included in the electronic program guide information with the channel, the recording reservation date, the recording start time and the recording end time included in the recording reservation information, and it is judged that any of them are in disagreement, makes modification to the recording reservation information through the timer reservation, and then replaces the recording reservation through the timer reservation to the recording reservation based on the electronic program guide information.

2. The information recording and reproducing device according to claim 1, wherein the recording reservation contents judgment part, after the judgment that the timer reservation has been set, when the electronic program guide information is updated, the electronic program guide information comes to include, after a predetermined period, program information indicating the channel, the scheduled broadcast date, the broadcast start time, and the broadcast end time respectively corresponding to the channel, the recording reservation date, the recording start time, and the recording end time included in the recording reservation information through the timer reservation whereby comparison of each of the information can be made, judges whether or not the channel, the scheduled broadcast date, the broadcast start time, and the broadcast end time included in the electronic program information respectively agree with the channel, the recording reservation date, the recording start time, and the recording end time included in the recording reservation information.

3. The information recording and reproducing device according to claim 1, further comprising a list display part which, to display the program added with the modification in a list on the display device, displays the program added with the modification on an electronic program guide screen on the display device after color coding or marking a display region of the program added with the modification.

4. An information recording and reproducing device recording a program channel selected by receiving a digital TV broadcast signal and other information onto a recording medium and also reproducing the program and the other information recorded on the recording medium, the information recording and reproducing device comprising:

a timer reservation judgment part judging whether or not timer reservation has been set, the timer reservation, through input operation of recording reservation information including a channel, a recording reservation date, recording start time, recording end time, and a recording mode, all related to a program to be recorded, storing the recording reservation information into a memory and then making recording reservation of the desired program;

a recording reservation contents judgment part, after the judgment that the timer reservation has been set, judging whether or not a channel, a scheduled broadcast date, broadcast start time, and broadcast end time included in electronic program guide extracted from a TV broadcast signal of a specific broadcast station respectively agree with the channel, the recording reservation date, the recording start time, and the recording end time included in the recording reservation information;

an agreement information display part, upon the judgment that the channel, the scheduled broadcast date, the broadcast start time, and the broadcast end time included in the electronic program guide extracted respectively agree with the channel, the recording reservation date, the recording start time, and the recording end time included in the recording reservation information, displaying on a display device agreement information indicating contents of the agreement;

a disagreement information display part, after the channel, the scheduled broadcast date, the broadcast start time, and the broadcast end time included in the electronic program guide extracted are respectively compared with the channel, the recording reservation date, the recording start time, and the recording end time included in the recording reservation information, upon judgment that any of them disagree with each other, displaying on the display device displaying on the display device disagreement information indicating contents of the disagreement;

a recording reservation replacement part, after the agreement information is displayed on the display device, making a replacement for the desired program from the recording reservation through the timer reservation to the recording reservation based on the electronic program guide information;

a selection detection part, which after the disagreement information is displayed on the display device, detects whether it has been selected to modify the recording reservation information though the timer reservation or to bring the channel, the recording start time, and the recording end time through the timer reservation into agreement with the channel, the broadcast start time, and the broadcast end time included in the electronic program guide information;

a reservation information input again enabling part, which upon the detection by the selection detection part that it has been selected to modify the recording reservation information through the timer reservation, enables inputting again of the recording reservation information through the timer reservation; and an information Agreement process part which, upon the detection by the selection detection part that it has been selected to bring the channel, the recording start time, and the recording end time through the timer reservation into agreement with the channel, the broadcast start time, and the broadcast end time included in the electronic program guide information, brings the channel, the recording start time, and the recording end time through the timer reservation into agreement with the channel, the broadcast start time, and the broadcast end time included in the electronic program guide information.

5. The information recording and reproducing device according to claim 4, wherein the recording reservation contents judgment part, after the judgment that the timer reservation has been set, when the electronic program guide information is updated, the electronic program guide information comes to include, after a predetermined period, program information indicating the channel, the scheduled broadcast date, the broadcast start time, and the broadcast end time respectively corresponding to the channel, the recording reservation date, the recording start time, and the recording end time included in the recording reservation information through the timer reservation whereby comparison of each of the information can be made, judges whether or not the channel, the scheduled broadcast date, the broadcast start time, and the broadcast end time included in the electronic program information respectively agree with the channel, the recording reservation date, the recording start time, and the recording end time included in the recording reservation information.

* * * * *